United States Patent
Yamada

(10) Patent No.: US 7,917,271 B2
(45) Date of Patent: Mar. 29, 2011

(54) VEHICLE AND TRAVELING STATE DETERMINATION METHOD OF VEHICLE

(75) Inventor: Takeshi Yamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 889 days.

(21) Appl. No.: 11/892,252

(22) Filed: Aug. 21, 2007

(65) Prior Publication Data

US 2008/0059033 A1 Mar. 6, 2008

(30) Foreign Application Priority Data

Aug. 29, 2006 (JP) ................................ 2006-232378

(51) Int. Cl.
*G06F 7/70* (2006.01)
*G06G 7/00* (2006.01)
*G06G 7/76* (2006.01)
*B60Q 1/00* (2006.01)

(52) U.S. Cl. ......................................... 701/70; 340/439

(58) Field of Classification Search .................... 701/70; 340/439

See application file for complete search history.

(56) References Cited

U.S. PATENT DOCUMENTS

| | | | | | |
|---|---|---|---|---|---|
| 5,463,370 | A | * | 10/1995 | Ishikawa et al. | 340/439 |
| 7,024,306 | B2 | * | 4/2006 | Minami et al. | 701/123 |
| 7,072,762 | B2 | * | 7/2006 | Minami et al. | 701/123 |
| 2005/0288850 | A1 | * | 12/2005 | Sato | 701/123 |
| 2007/0176762 | A1 | * | 8/2007 | Aoyagi et al. | 340/439 |

FOREIGN PATENT DOCUMENTS

| | | |
|---|---|---|
| JP | 58-006228 | 1/1983 |
| JP | 10-252520 | 9/1998 |
| JP | 2002-370560 | 12/2002 |
| JP | 2006-076415 | 3/2006 |

* cited by examiner

*Primary Examiner* — Khoi Tran
*Assistant Examiner* — Nicholas Kiswanto
(74) *Attorney, Agent, or Firm* — Kenyon & Kenyon LLP

(57) ABSTRACT

When an accelerator opening Acc is smaller than a flat road threshold Aref1, an ECO indicator is illuminated, and when the accelerator opening Acc is equal to or larger than a climbing road threshold Aref2 larger than the flat road threshold Aref1, the ECO indicator is extinguished (S120 and S220), when the accelerator opening Acc is equal to or larger than the flat road threshold Aref1 and smaller than the climbing road threshold Aref2, the previous state of the ECO indicator is maintained until climbing road determination performed based on a vehicle speed V is finished, and when the climbing road determination is finished, the ECO indicator is illuminated or extinguished based on the result of the determination.

6 Claims, 3 Drawing Sheets

VEHICLE AND TRAVELING STATE DETERMINATION METHOD OF VEHICLE

BACKGROUND

1. Technical Field

The present invention relates to a vehicle and a traveling state determination method of the vehicle, and more particularly to a vehicle and a determination method of the vehicle for determining whether a traveling state of the vehicle is an energy efficient state.

2. Related Art

A conventionally proposed vehicle of this type detects and calculates a depression amount, a depression speed, a depression acceleration, or the like of an accelerator pedal, checking these values with a vehicle speed, a vehicle speed change, an engine operation state, a gradient, or the like to obtain a target acceleration value of the vehicle, and displays an error obtained by a comparison between the target acceleration value and the depression amount of the accelerator pedal on a display in the vehicle (for example, Japanese Patent Laid-Open No. 2002-370560). In the vehicle, information from various sensors and information sources are used to determine whether an accelerator operation is proper, and the determination result is displayed to a driver.

SUMMARY

In the above described vehicle, the information from the various sensors and the information sources are used to determine whether the accelerator operation is proper, but the detailed way of determination using the various kinds of information is not clarified. Also, the information from the various sensors and the information sources are used, which makes a determination method complicated.

A vehicle and a traveling state determination method of the vehicle of the present invention has an object to more properly determine whether a traveling state of the vehicle is an energy efficient state. The vehicle and the traveling state determination method of the vehicle of the present invention has another object to determine whether a traveling state of the vehicle is an energy efficient state with a simple configuration.

In order to achieve at least part of the above described objects, the vehicle and the traveling state determination method of the vehicle of the present invention adopts units described below.

The present invention is directed to a vehicle. The vehicle includes an accelerator operation amount detection unit for detecting an accelerator operation amount; a vehicle speed detection unit for detecting a vehicle speed; a climbing road traveling determination unit for performing climbing road traveling determination whether the vehicle travels on a predetermined climbing road based on the detected vehicle speed; a traveling state determination unit for determining that a traveling state of the vehicle is a good state that is an energy efficient state when the detected accelerator operation amount is smaller than a first operation amount, determining that the traveling state of the vehicle is a poor state that is an energy inefficient state when the detected accelerator operation amount is equal to or larger than a second operation amount larger than the first operation amount, maintaining a determination result of the previous traveling state of the vehicle while the climbing road traveling determination unit performs the climbing road traveling determination when the detected accelerator operation amount is equal to or larger than the first operation amount and smaller than the second operation amount, determining that the traveling state of the vehicle is the good state when the climbing road traveling determination unit determines that the vehicle travels on the predetermined climbing road when the detected accelerator operation amount is equal to or larger than the first operation amount and smaller than the second operation amount, and determining that the traveling state of the vehicle is the poor state when the climbing road traveling determination unit determines that the vehicle does not travel on the predetermined climbing road when the detected accelerator operation amount is equal to or larger than the first operation amount and smaller than the second operation amount; and a notification unit for notifying an occupant of the determination result by the traveling state determination unit.

In the vehicle of the present invention, it is determined and notified to the occupant that the traveling state of the vehicle is the good state that is the energy efficient state when the accelerator operation amount is smaller than the first operation amount, and it is determined and notified to the occupant that the traveling state of the vehicle is the poor state that is the energy inefficient state when the accelerator operation amount is equal to or larger than the second operation amount larger than the first operation amount. Then, the climbing road traveling determination whether the vehicle travels on the predetermined climbing road is performed based on the vehicle speed when the accelerator operation amount is equal to or larger than the first operation amount and smaller than the second operation amount, the determination result of the previous traveling state of the vehicle is maintained while the climbing road traveling determination is performed. It is determined and notified to the occupant that the traveling state of the vehicle is the good state when it is determined in the climbing road traveling determination that the vehicle travels on the predetermined climbing road, and it is determined and notified to the occupant that that the traveling state of the vehicle is the poor state when it is determined that the vehicle does not travel on the predetermined climbing road. Thus, the accelerator operation amount is changed from the mount smaller than the first operation amount or the amount equal to or larger than the second operation amount to the amount equal to or larger than the first operation amount and the amount smaller than the second operation amount, thereby stabilizing notification during the time between the finish of the climbing road traveling determination and the determination whether the traveling state of the vehicle is good or poor. Specifically, when the accelerator operation amount is changed from the amount smaller than the first operation amount, notification is performed that the traveling state of the vehicle is good until the finish of the climbing road traveling determination, and after the finish of the climbing road traveling determination, notification based on the determination result is performed. On the other hand, when the accelerator operation amount is changed from the amount equal to or larger than the second operation amount, notification is performed that the traveling state of the vehicle is poor until the finish of the climbing road traveling determination, and after the finish of the climbing road traveling determination, notification based on the determination result is performed. This can prevent improper changes in whether the traveling state is good or poor caused by the change in the accelerator operation amount. Thus, whether the traveling state of the vehicle is the good state or the poor state can be more properly determined and notified. Further, whether the traveling state of the vehicle is the good state or the poor state is determined only by the accelerator operation amount and the vehicle speed, which allows a simple configuration.

In one preferable embodiment of the vehicle of the invention, the vehicle further includes an operation amount setting unit for setting the first operation amount and the second operation amount based on the detected vehicle speed. In this case, the operation amount setting unit may set the first operation amount and the second operation amount so as to increase with increasing vehicle speed. This can be prevented that the traveling state of the vehicle is the poor state even with a relatively large accelerator operation amount when the vehicle speed is high.

In another preferable embodiment of the vehicle of the invention, the traveling state determination unit determines that the vehicle travels on the predetermined climbing road when a change amount of the detected vehicle speed is equal to or larger than a predetermined change amount. Whether the vehicle travels on the predetermined climbing road thus can be more properly determined.

In still another preferable embodiment of the vehicle of the invention, the notification unit has an illuminatable display portion on the front of a driver seat, illuminates the display portion when the traveling state determination unit determines that the traveling state is the good state, and extinguishes the display portion when the traveling state determination unit determines that the traveling state is the poor state. The determination result on whether the traveling state of the vehicle is the good state or the poor state thus can be visually notified to a driver.

The present invention is also directed to a traveling state determination method of a vehicle for determining whether a traveling state of the vehicle is a good state that is an energy efficient state or a poor state that is an energy inefficient state in notification of whether the traveling state is the good state or the poor state to an occupant by illuminating or extinguishing an indicator mounted in a compartment. The method determines that the traveling state of the vehicle is the good state when an accelerator operation amount is smaller than a first operation amount. The method also determines that the traveling state of the vehicle is the poor state when the accelerator operation amount is equal to or larger than the second operation amount larger than the first operation amount. The method maintains a determination result of the previous traveling state of the vehicle while climbing road traveling determination whether the vehicle travels on a predetermined climbing road is performed based on a vehicle speed when the accelerator operation amount is equal to or larger than the first operation amount and smaller than the second operation amount. The method determines that the traveling state of the vehicle is the good state when it is determined in the climbing road traveling determination that the vehicle travels on the predetermined climbing road when the accelerator operation amount is equal to or larger than the first operation amount and smaller than the second operation amount. The method determines that the traveling state of the vehicle is the poor state when it is determined in the climbing road traveling determination that the vehicle does not travel on the predetermined climbing road when the accelerator operation amount is equal to or larger than the first operation amount and smaller than the second operation amount.

In the traveling state determination method of the vehicle of the present invention, it is determined and notified to the occupant that the traveling state of the vehicle is the good state that is the energy efficient state when the accelerator operation amount is smaller than the first operation amount, and it is determined and notified to the occupant that the traveling state of the vehicle is the poor state that is the energy inefficient state when the accelerator operation amount is equal to or larger than the second operation amount larger than the first operation amount. Then, the climbing road traveling determination whether the vehicle travels on the predetermined climbing road is performed based on the vehicle speed when the accelerator operation amount is equal to or larger than the first operation amount and smaller than the second operation amount, the determination result of the previous traveling state of the vehicle is maintained while the climbing road traveling determination is performed. It is determined and notified to the occupant that the traveling state of the vehicle is the good state when it is determined in the climbing road traveling determination that the vehicle travels on the predetermined climbing road, and it is determined and notified to the occupant that that the traveling state of the vehicle is the poor state when it is determined that the vehicle does not travel on the predetermined climbing road. Thus, the accelerator operation amount is changed from the mount smaller than the first operation amount or the amount equal to or larger than the second operation amount to the amount equal to or larger than the first operation amount and the amount smaller than the second operation amount, thereby stabilizing notification during the time between the finish of the climbing road traveling determination and the determination whether the traveling state of the vehicle is good or poor. Specifically, when the accelerator operation amount is changed from the amount smaller than the first operation amount, notification is performed that the traveling state of the vehicle is good until the finish of the climbing road traveling determination, and after the finish of the climbing road traveling determination, notification based on the determination result is performed. On the other hand, when the accelerator operation amount is changed from the amount equal to or larger than the second operation amount, notification is performed that the traveling state of the vehicle is poor until the finish of the climbing road traveling determination, and after the finish of the climbing road traveling determination, notification based on the determination result is performed. This can prevent improper changes in whether the traveling state is good or poor caused by the change in the accelerator operation amount. Thus, whether the traveling state of the vehicle is the good state or the poor state can be more properly determined and notified. Further, whether the traveling state of the vehicle is the good state or the poor state is determined only by the accelerator operation amount and the vehicle speed, which allows a simple configuration.

In one preferable embodiment of the traveling state determination method of the vehicle of the invention, the method sets the first operation amount and the second operation amount so as to increase with increasing vehicle speed. This can be prevented that the traveling state of the vehicle is the poor state even with a relatively large accelerator operation amount when the vehicle speed is high.

In another preferable embodiment of the traveling state determination method of the vehicle of the invention, the method determines that the vehicle travels on the predetermined climbing road when a change amount of the vehicle speed is equal to or larger than a predetermined change amount. Whether the vehicle travels on the predetermined climbing road thus can be more properly determined.

DESCRIPTION OF THE PREFERRED EMBODIMENTS

Figure 1:
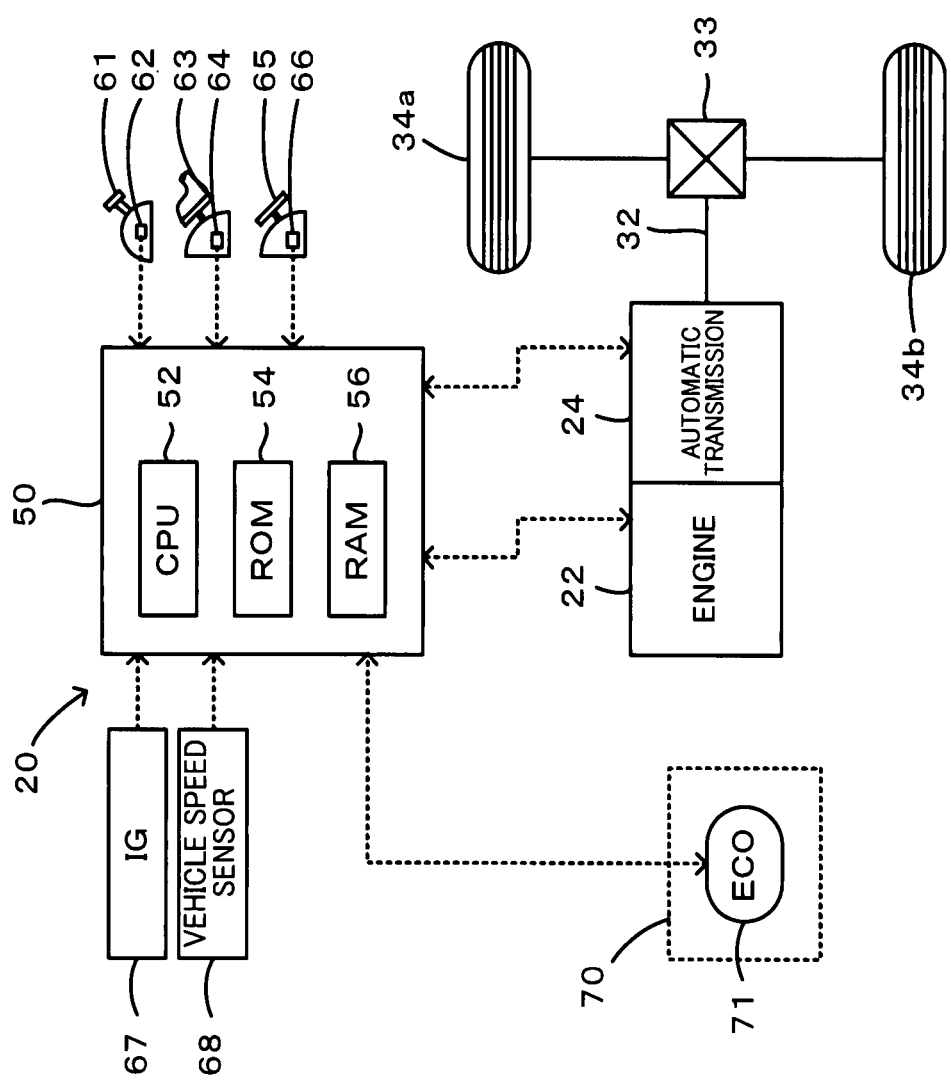
FIG. 1 is a schematic block diagram of a configuration of an automobile 20 according to an embodiment of the present invention.

Now, a preferred embodiment of the present invention will be described. FIG. 1 is a schematic block diagram of a configuration of an automobile 20 according to an embodiment of the present invention. As shown, the automobile 20 of the embodiment is configured to travel in such a manner that power from an engine 22 is changed in speed by an automatic transmission 24 and output to drive wheels 34a and 34b via a drive shaft 32 and a differential gear 33, and includes an ECO indicator 71 mounted in an occupant compartment 70, and a main electronic control unit 50 for controlling the entire vehicle.

The ECO indicator 71 is incorporated in a combination meter mounted on the front of a driver seat in the occupant compartment 70 together with other various indicators, and notifies a driver of whether a traveling state of the vehicle is energy efficient or not by illuminating or extinguishing characters of ECO.

The main electronic control unit 50 is configured as a microprocessor mainly including a CPU 52, a ROM 54 that stores a processing program, a RAM 56 that temporarily stores data, and unshown input and output ports. To the main electronic control unit 50, a shift position SP from a shift position sensor 62 for detecting an operation position of a shift lever 61, an accelerator opening Acc from an accelerator pedal position sensor 64 for detecting a depression amount of an accelerator pedal 63, a brake pedal position BP from a brake pedal position sensor 66 for detecting a depression amount of a brake pedal 65, an ignition signal from an ignition switch 67, a vehicle speed V from a vehicle speed sensor 68, signals from various sensors for detecting the state of the engine 22, signals from various sensors for detecting the state of the automatic transmission 24, or the like are input through the input port. From the main electronic control unit 50, various control signals for controlling the engine 22, various control signals for controlling the automatic transmission 24, or the like are output through the output port.

Figure 2:
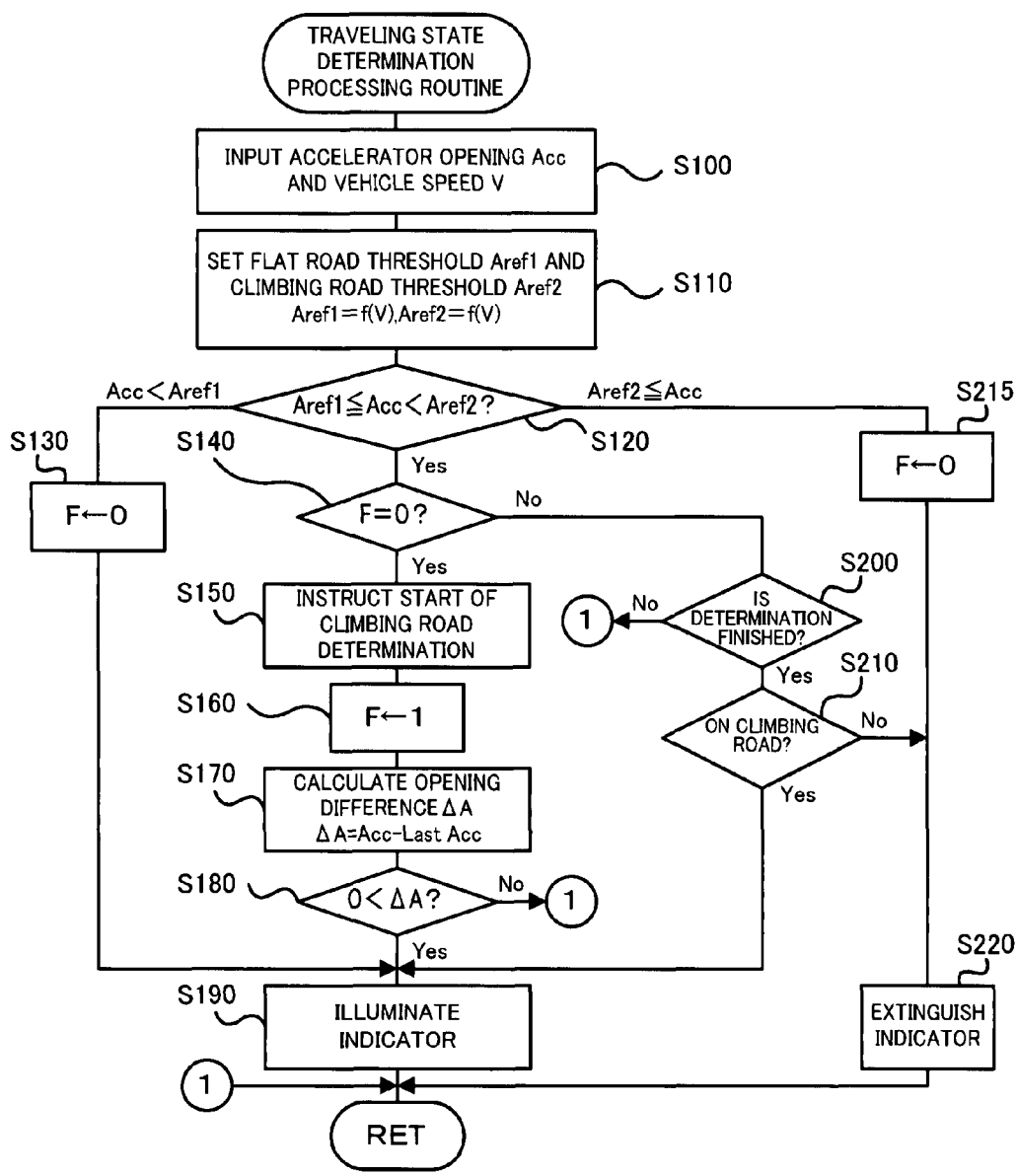
FIG. 2 is a flowchart showing an example of a traveling state determination processing routine executed by a main electronic control unit 50 of the embodiment.

Next, an operation of the automobile 20 of the embodiment thus configured, particularly, an operation in determination and notification to an occupant whether a traveling state of the vehicle is an energy efficient state will be described. FIG. 2 is a flowchart showing an example of a traveling state determination processing routine executed by the CPU 52 of the main electronic control unit 50. This routine is repeatedly executed every predetermined time (for example, every several ten msec).

Figure 3:
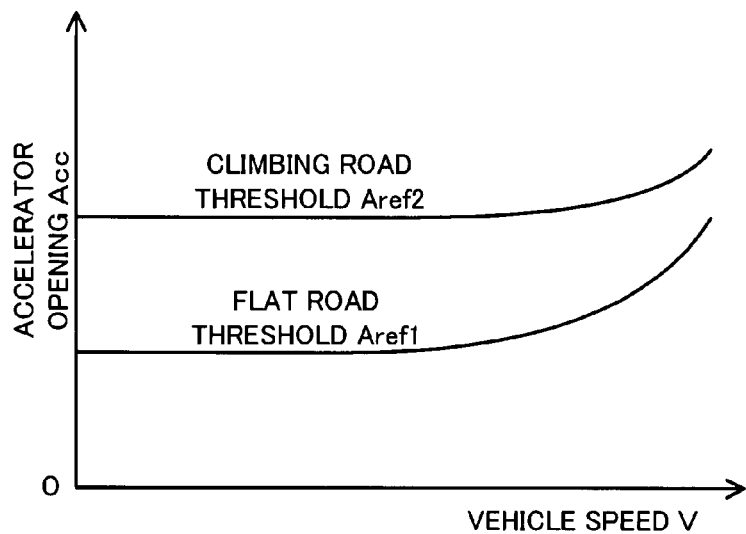
FIG. 3 illustrates an example of an opening threshold setting map.

When the traveling state determination processing routine is executed, the CPU 52 of the main electronic control unit 50 first inputs data required for a determination processing such as the accelerator opening Acc from the accelerator position sensor 64 and the vehicle speed V from the vehicle speed sensor 67 (Step S100), and executes a processing for setting a flat road threshold Aref1 and a climbing road threshold Aref2 based on the input vehicle speed V (Step S110). The flat road threshold Aref1 is a threshold for determining whether the accelerator opening Acc is too large in terms of energy efficiency of the vehicle on a traveling road including a flat road other than a climbing road, and the climbing road threshold Aref2 is a threshold larger than the flat road threshold Aref1 for determining whether the accelerator opening Acc is too large in terms of energy efficiency of the vehicle on the climbing road. In the embodiment, the flat road threshold Aref1 and the climbing road threshold Aref2 are set by previously determining the relationship between the vehicle speed V, the flat road threshold Aref1 and the climbing road threshold Aref2, storing the relationship in the ROM 54 as an opening threshold setting map, and deriving a corresponding flat road threshold Aref1 and a corresponding climbing road threshold Aref2 from the stored map when the vehicle speed V is given. FIG. 3 shows an example of the opening threshold setting map. As shown, the flat road threshold Aref1 and the climbing road threshold Aref2 are set so as to increase with increasing vehicle speed V. This is based on an increase in power required for the vehicle with increasing vehicle speed V.

Then, the accelerator opening Acc is compared with the flat road threshold Aref1 and the climbing road threshold Aref2 (Step S120), and when the accelerator opening Acc is smaller than the flat road threshold Aref1, it is determined that the traveling state of the vehicle is an energy efficient state, a depression determination start flag F is reset to the value of zero (Step S130), the ECO indicator 71 is illuminated (Step S190), and the routine is finished. The depression determination start flag F is set to the value of zero when the accelerator opening Acc is smaller than the flat road threshold Aref1 or the accelerator opening Acc is equal to or larger than the climbing road threshold Aref2, and the depression determination start flag F is set to the value of one when a climbing road determination processing is started for determining whether the vehicle travels on the climbing road when the accelerator opening Acc is equal to or larger than the flat road threshold Aref1 and smaller than the climbing road threshold Aref2. When the ECO indicator 71 has been already illuminated, the illumination state is continued.

When the accelerator opening Acc is equal to or larger than the climbing road threshold Aref2, it is determined that the traveling state of the vehicle is an energy inefficient state, the depression determination start flag F is reset to the value of zero (Step S215), the ECO indicator 71 is extinguished (Step S220), and the routine is finished. When the ECO indicator 71 has been already extinguished, the extinguishing state is continued.

When the accelerator opening Acc is equal to or larger than the flat road threshold Aref1 and smaller than the climbing road threshold Aref2, it is determined whether the depression determination start flag F is the value of zero (Step S140). Now, the case where a driver depresses the accelerator pedal 63 and the accelerator opening Acc becomes equal to or larger than the flat road threshold Aref1 or the case where the driver returns the deeply depressed accelerator pedal 63 and the accelerator opening Acc becomes smaller than the climbing road threshold Aref2 are supposed. At this time, the depression determination start flag F is the value of zero. In this case, a start of the climbing road determination processing for determining whether the vehicle travels on the climbing road is instructed (Step S150), and the depression determination start flag F is set to the value of one (Step S160). When the routine is again executed and the accelerator opening Acc becomes equal to or larger than the flat road threshold Aref1 and smaller than the climbing road threshold Aref2 with the depression determination start flag F being set to the value of one, that is, the accelerator opening Acc is continuously equal to or larger than the flat road threshold Aref1 and smaller than the climbing road threshold Aref2, it is determined in Step S140 that the depression determination start flag F is the value of one. The climbing road determination processing will be described later.

When the depression determination start flag F is set to the value of one, an opening difference ΔA is calculated by subtracting, from the accelerator opening Acc, the accelerator opening Acc input in the last execution of the routine (Step S170), and it is determined whether the opening difference ΔA is positive or negative (Step S180). When the opening difference ΔA is positive, that is, when the accelerator opening Acc becomes equal to or larger than the flat road threshold Aref1 and smaller than the climbing road threshold Aref2 by the depression of the accelerator pedal 63, the ECO indicator 71, is continuously illuminated (Step S190), and the routine is finished. When the opening difference ΔA is negative, that is, when the accelerator opening Acc becomes equal to or larger than the flat road threshold Aref1 and smaller than the climbing road threshold Aref2 by the return of the depression of the accelerator pedal 63, the ECO indicator 71 is continuously extinguished, and the routine is finished.

When the depression determination start flag F is the value of one in Step S140, it is determined whether the climbing road determination processing is finished (Step S200). When the climbing road determination processing is not finished, the routine is finished. Thus, the previous illumination or extinguishing state of the ECO indicator 71 is continued until the finish of the climbing road determination processing. When the climbing road determination processing is finished, it is determined whether the vehicle travels on the climbing road (Step S210). When it is determined that the vehicle travels on the climbing road, the ECO indicator 71 is illuminated (Step S190). When it is determined that the vehicle does not travel on the climbing road, the ECO indicator 71 is extinguished (Step S220), and the routine is finished.

Figure 4:
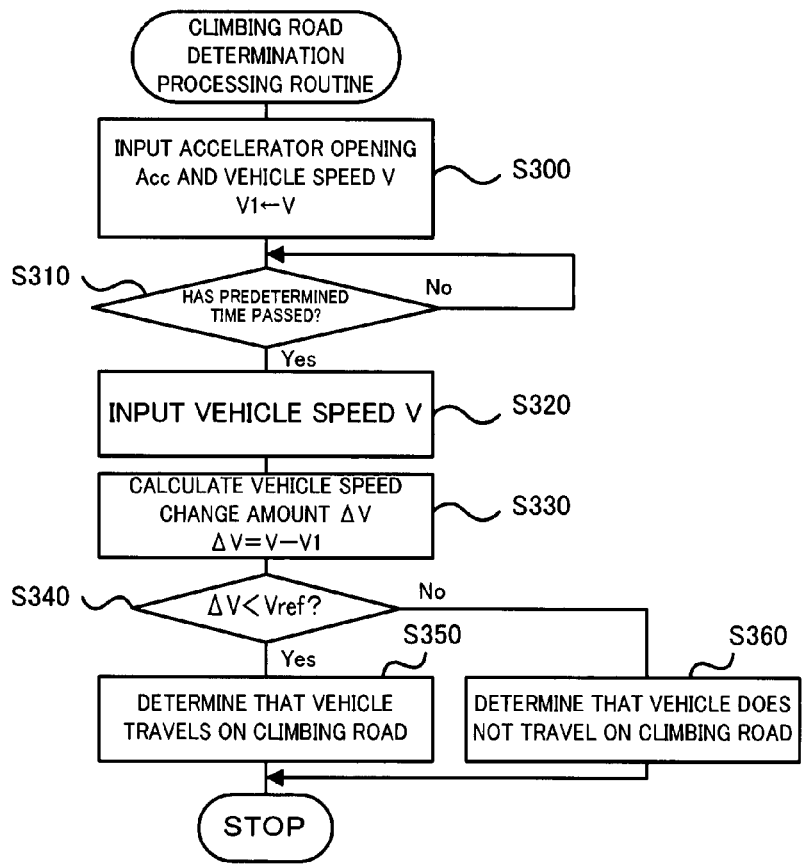
FIG. 4 is a flowchart showing an example of a climbing road determination processing routine executed by the main electronic control unit 50 of the embodiment.

Next, the climbing road determination processing executed by the flowchart exemplified in FIG. 4 will be described. When the climbing road determination processing routine is executed, the CPU 52 of the main electronic control unit 50 first inputs the vehicle speed V from the vehicle speed sensor 67 and assigns the input vehicle speed V to a variable V1 (Step S300), a passage of predetermined time (for example, one second) is waited (Step S310), the accelerator opening Acc from the accelerator position sensor 64 and the vehicle speed V from the vehicle speed sensor 67 are input (Step S320), and a processing for calculating a vehicle speed change amount ΔV by subtracting the variable V1 from the input vehicle speed V is performed (Step S330). Then, it is determined whether the calculated vehicle speed change amount ΔV is smaller than a threshold Vref (Step S340). When the vehicle speed change amount ΔV is smaller than the threshold Vref, it is determined that the vehicle travels on the climbing road (Step S350). When the vehicle speed change amount ΔV is equal to or larger than the threshold Vref, it is determined that the vehicle does not travel on the climbing road (Step S360), and the routine is finished. The threshold Vref is set as a vehicle speed change amount in the passage of the predetermined time for traveling on a predetermined climbing road (for example, a climbing road having a gradient of 5 degrees) at the accelerator opening at the time. In the embodiment, the relationship between the accelerator opening Acc and the threshold Vref is previously determined by an experiment or the like and stored in the ROM 54 as a threshold setting map, and a corresponding threshold Vref is derived from the stored map and set when the accelerator opening Acc is given.

With the above described automobile 20 of the embodiment, when the accelerator opening Acc is smaller than the flat road threshold Aref1, it is determined that the traveling state of the vehicle is the energy efficient state to illuminate the ECO indicator 71, and when the accelerator opening Acc is equal to or larger than the climbing road threshold Aref2, it is determined that the traveling state of the vehicle is the energy inefficient state to extinguish the ECO indicator 71, and when the accelerator opening Acc is equal to or larger than the flat road threshold Aref1 and smaller than the climbing road threshold Aref2, the ECO indicator 71 is illuminated or extinguished based on the result of the climbing road determination. Thus, whether the traveling state of the vehicle is the good state can be more properly determined and notified. Also, the previous state of the ECO indicator 71 is maintained until the finish of the climbing road determination processing, thereby preventing improper flashing of the ECO indicator 71. Further, whether the traveling state of the vehicle is good or poor is determined only by the accelerator operation amount Acc and the vehicle speed V, which allows a simple configuration.

In the automobile 20 of the embodiment, the flat road threshold Aref1 and the climbing road threshold Aref2 are derived from the threshold setting map and set based on the vehicle speed V, and compared with the accelerator opening Acc, but a predetermined flat road threshold Aref1 and a predetermined climbing road threshold Aref2 may be compared with the accelerator opening Acc without setting the flat road threshold Aref1 and the climbing road threshold Aref2 based on the vehicle speed V.

In the automobile 20 of the embodiment, the ECO indicator 71 is illuminated when the traveling state of the vehicle is energy efficient, and extinguished when the traveling state of the vehicle is energy inefficient. Instead of the ECO indicator 71, however, a waste indicator may be provided so as to be extinguished when the traveling state of the vehicle is energy efficient and illuminated when the traveling state of the vehicle is energy inefficient. In the automobile 20 of the embodiment, the ECO indicator 71 is provided that notifies a driver of whether the traveling state of the vehicle is energy efficient or not by illuminating or extinguishing the characters of ECO. Instead of the ECO indicator 71, however, a device may be provided that notifies a driver or an occupant of whether the traveling state of the vehicle is energy efficient by voice.

In the automobile 20 of the embodiment, the climbing road determination processing is executed and the ECO indicator 71 is illuminated or extinguished based on the result of the climbing road determination also when the deeply depressed accelerator pedal 63 is returned and the accelerator opening Acc becomes smaller than the climbing road threshold Aref2. However, the climbing road determination may be omitted when the deeply depressed accelerator pedal 63 is returned and the accelerator opening Acc becomes smaller than the climbing road threshold Aref2. In this case, the ECO indicator 71 may be continuously extinguished.

In the embodiment, the present invention is applied to the automobile 20 that outputs power from the engine 22 to the drive shaft 32 via the automatic transmission 24 for the description. The automatic transmission 24 may be stepped or stepless. Also, the present invention may be applied to an electric vehicle that travels by power from a motor, or a hybrid vehicle including an engine and a first motor that output power to an axle via a planetary gear mechanism and a second motor that can input and output power to the axle.

Now, the corresponding relationships between main components of the embodiment and main components of the invention described in the section of SUMMARY will be described. In the embodiment, the accelerator pedal position sensor 64 for detecting the accelerator opening Acc corresponds to an "accelerator operation amount detection unit", the vehicle speed sensor 68 for detecting the vehicle speed V corresponds to a "vehicle speed detection unit", the main electronic control unit 50 for performing the climbing road determination processing in Steps S300 to S360 for determining that the vehicle travels on the climbing road when the vehicle speed change amount ΔV calculated by inputting the vehicle speed V is smaller than the threshold Vref, and that the vehicle does not travel on the climbing road when the vehicle speed change amount ΔV is equal to or larger than the threshold Vref corresponds to a "climbing road traveling determination unit", the main electronic control unit 50 for performing the processing in Steps S120 to S220 for illuminating the ECO indicator 71 when the accelerator opening Acc is smaller than the flat road threshold Aref1, extinguishing the ECO indicator 71 when the accelerator opening Acc is equal to or larger than the climbing road threshold Aref2, instructing the start of the climbing road determination to maintain the state of the ECO indicator 71 when the accelerator opening Acc is equal to or larger than the flat road threshold Aref1 and smaller than the climbing road threshold Aref2, and illuminating or extinguishing the ECO indicator 71 based on the result of the climbing road determination corresponds to a "traveling state determination unit", and the ECO indicator 71 mounted in the occupant compartment 70 corresponds to a "notification unit". Also, the main electronic control unit 50 for performing the processing in Step S110 for setting the flat road threshold Aref1 and the climbing road threshold Aref2 based on the vehicle speed V corresponds to an "operation amount setting unit". For the corresponding relationships between the components of the embodiment and the components of the invention described in the section of SUMMARY, the components of the embodiment are not restrictive of the components of the invention described in the section of SUMMARY because the embodiment is an example for detailed description of the best mode for carrying out the invention described in the section of SUMMARY. Specifically, the invention described in the section of SUMMARY should be construed based on the description of the section, and the embodiment is merely a detailed example of the invention described in the section of SUMMARY.

In the embodiment, the present invention is applied to the automobile 20 for the description. The present invention may be, however, applied to a vehicle such as a train other than an automobile, or a traveling state determination method of a vehicle including an automobile or a train.

The embodiment and its modifications discussed above are to be considered in all aspects as illustrative and not restrictive. There may be many other modifications, changes, and alterations without departing from the scope or spirit of the main characteristics of the present invention.

The disclose of Japanese Patent Application No. 2006-232378 filed Aug. 29, 2006 including specification, drawings and claims is incorporated herein by reference in its entirety.

What is claimed is:

1. A vehicle comprising:
   an accelerator operation amount detection unit for detecting an accelerator operation amount;
   a vehicle speed detection unit for detecting a vehicle speed;
   a climbing road traveling determination unit for performing climbing road traveling determination whether the vehicle travels on a predetermined climbing road based on said detected vehicle speed;
   a traveling state determination unit for determining that a traveling state of the vehicle is a good state that is an energy efficient state when said detected accelerator operation amount is smaller than a first operation amount, determining that the traveling state of the vehicle is a poor state that is an energy inefficient state when said detected accelerator operation amount is equal to or larger than a second operation amount larger than said first operation amount, maintaining a determination result of the previous traveling state of the vehicle while said climbing road traveling determination unit performs the climbing road traveling determination when said detected accelerator operation amount is equal to or larger than said first operation amount and smaller than said second operation amount, determining that the traveling state of the vehicle is the good state when said climbing road traveling determination unit determines that the vehicle travels on said predetermined climbing road when said detected accelerator operation amount is equal to or larger than said first operation amount and smaller than said second operation amount, and determining that the traveling state of the vehicle is the poor state when said climbing road traveling determination unit determines that the vehicle does not travel on said predetermined climbing road when said detected accelerator operation amount is equal to or larger than said first operation amount and smaller than said second operation amount; and
   a notification unit for notifying an occupant of the determination result by said traveling state determination unit.

2. A vehicle according to claim 1, said vehicle further comprising an operation amount setting unit for setting said first operation amount and said second operation amount based on said detected vehicle speed.

3. A vehicle according to claim 2, wherein said operation amount setting unit sets said first operation amount and said second operation amount so as to increase with increasing vehicle speed.

4. A vehicle according to claim 1, wherein said traveling state determination unit determines that the vehicle travels on said predetermined climbing road when a change amount of said detected vehicle speed is equal to or larger than a predetermined change amount.

5. A vehicle according to claim 1, wherein said notification unit has an illuminatable display portion on the front of a driver seat, illuminates said display portion when said traveling state determination unit determines that the traveling state is the good state, and extinguishes said display portion when said traveling state determination unit determines that the traveling state is the poor state.

6. A traveling state determination method of a vehicle for determining whether a traveling state of the vehicle is a good state that is an energy efficient state or a poor state that is an energy inefficient state in notification of whether the traveling state is the good state or the poor state to an occupant by illuminating or extinguishing an indicator mounted in a compartment,
   said method determining that the traveling state of the vehicle is the good state when an accelerator operation amount is smaller than a first operation amount,
   said method determining that the traveling state of the vehicle is the poor state when the accelerator operation amount is equal to or larger than said second operation amount larger than said first operation amount,
   said method maintaining a determination result of the previous traveling state of the vehicle while climbing road traveling determination whether the vehicle travels on a predetermined climbing road is performed based on a vehicle speed when the accelerator operation amount is equal to or larger than said first operation amount and smaller than said second operation amount,
   said method determining that the traveling state of the vehicle is the good state when it is determined in said climbing road traveling determination that the vehicle travels on said predetermined climbing road when the accelerator operation amount is equal to or larger than said first operation amount and smaller than said second operation amount, and said method determining that the traveling state of the vehicle is the poor state when it is determined in said climbing road traveling determination that the vehicle does not travel on said predetermined climbing road when the accelerator operation amount is equal to or larger than said first operation amount and smaller than said second operation amount.

* * * * *